Figure 1:
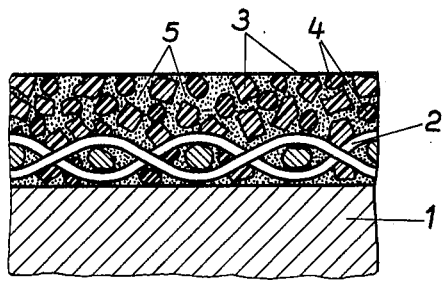

United States Patent [19]

Hodes et al.

[11] 4,156,049

[45] May 22, 1979

[54] LAMINATE, PARTICULARLY FOR ANTI-FRICTION AND SLIDE MEMBERS, AND METHOD FOR THE PRODUCTION OF THE SAME

[75] Inventors: Erich Hodes, Rodheim; Danilo Sternisa, Nauheim, both of Fed. Rep. of Germany

[73] Assignee: Glyco-Metall-Werke Daelen & Loos GmbH, Wiesbaden-Schierstein, Fed. Rep. of Germany

[21] Appl. No.: 875,810

[22] Filed: Feb. 7, 1978

[30] Foreign Application Priority Data

Feb. 18, 1977 [DE] Fed. Rep. of Germany ....... 2707041

[51] Int. Cl.² .................... B32B 27/34; B32B 15/08
[52] U.S. Cl. .................... 428/409; 428/419; 428/422; 428/474; 428/458
[58] Field of Search .............. 428/422, 474 I, 474 M, 428/458, 419, 408, 409

[56] References Cited

U.S. PATENT DOCUMENTS

| | | | |
|---|---|---|---|
| T952,005 | 11/1976 | Attwood et al. | 428/422 X |
| 3,108,018 | 10/1963 | Lewis | 428/422 X |
| 3,151,015 | 9/1964 | Griffith | 428/422 X |
| 3,198,691 | 8/1965 | Thomas et al. | 428/422 X |
| 3,352,714 | 11/1971 | Anderson et al. | 428/474 X |
| 3,582,458 | 6/1971 | Haller | 428/458 X |
| 3,716,348 | 2/1973 | Perkins | 428/422 X |
| 3,959,233 | 5/1976 | Hanson et al. | 428/458 X |
| 4,039,713 | 8/1977 | Vassiliou | 428/458 X |
| 4,073,788 | 2/1978 | Peterson | 428/458 |

*Primary Examiner*—Harold Ansher
*Attorney, Agent, or Firm*—H. Gibner Lehmann; K. Gibner Lehmann

[57] ABSTRACT

A laminate for anti-friction and slide members, comprising a metallic substrate strip having bonded to its surface a slide layer of thermally, highly stressable plastics containing thermosetting polyimide resins and polytetrafluorethylene, wherein the slide layer additionally contains polyimide lacquer mixed therein in the form of a fine powder to bond the layer to the substrate, said lacquer containing thermoplastic material selected from the group consisting of polyarylene sulfide, aliphatic polysulfide and polysulfone, thereby to improve the heat and abrasion resistance of the slide layer.

6 Claims, 4 Drawing Figures

LAMINATE, PARTICULARLY FOR ANTI-FRICTION AND SLIDE MEMBERS, AND METHOD FOR THE PRODUCTION OF THE SAME

CROSS REFERENCES TO RELATED APPLICATIONS

1. Copending U.S. application Ser. No. 851,472, filed on Nov. 14, 1977, in the names of Erich Hodes and Danilo Sternisa, entitled Laminated Material and Method for its Production by means of Thermokinetic Plating.

2. Copending U.S. application Ser. No. 850,159, filed on Nov. 10, 1977, in the names of Erich Hodes and Danilo Sternisa, entitled Laminated Material for the Production of Plain Bearing Elements and Method for its Production.

3. Copending U.S. application Ser. No. 851,398, filed on Nov. 14, 1977, in the name of Erich Roemer, entitled White Metal Bearing Alloy of Lead, Tin and Copper, for Plain Bearing Laminates.

4. Copending U.S. application Ser. No. 875,132, filed on Feb. 6, 1978 in the names of Erich Hodes and Danilo Sternisa, and entitled Method and Equipment for Producing Thin, Composite Laminates.

5. Copending German Application of Erich Hodes and Danilo Sternisa, entitled Schichtwerkstoff, insbesondere für Reib-und Gleitelemente mit metallischem Stutzkorper und einer mit dem Stutzkorper verbundenen Reibbzw. Gleitschicht aus thermisch hochbelastbaren Kunststoffen, sowie Verfahren zur Herstellung solcher Schichtwerkstoffe, German Ser. No. P 27 07 041.3 filed in Germany on Feb. 18, 1977, on which application a priority claim is hereby made, pursuant to Section 119 of the Patent Act of 1952.

BACKGROUND

This invention relates to laminates, and more particularly to thin laminate structures intended for use as anti-friction and slide bearing members wherein a metallic substrate strip has bonded to it an anti-friction or slide layer of plastics material. The anti-friction slide layer can consist of thermally, highly-stressable plastics and can contain thermosetting polyimide resins and additives which improve the running properties of a bearing, such as polytetrafluorethylene, metallic bearing alloys or the like. The slide layer additionally can contain polyimide resins and other additives, as for example polyimide lacquer as a binding and bonding agent, and polyimide resins in fine-grained or fine-powdered form.

It is an object of the invention to improve the above, known laminates of this kind considerably, so that in addition to good low-friction and sliding characteristics there is had a much greater heat and abrasion resistance.

According to the invention, the fine-grained or fine-powdered polyimide resin mixture which the polyimide lacquer binds is supplemented with a highly heat and abrasion resistant thermoplastic material from the group consisting of polyarylene sulfide and/or aliphatic polysulfide and/or polysulfone, thereby to effect the above-identified improvements.

As found through actual tests, a surprisingly and unexpectedly great improvement of the heat and abrasion resistance of the anti-friction or slide layer is attained by the addition of one or more of such thermoplastic materials from the group mentioned.

The additive thermoplastic material, preferably polyphenylene sulfide, is incorporated as a fine-grained powder with the other additives that are used to improve the running properties. The percentage of such thermoplastic material which is added to improve the heat resistance and increase the abrasion resistance should be between 30 percent by weight up to 80 percent by weight, relative to the total weight of the anti-friction or slide layer. This means that the constituents depended on to improve the running properties of the bearing can be constituted completely of the thermoplastic additive substance provided by the invention for the purpose of improving the heat and abrasion resistance. We have also found that it is possible to admix the special additive thermoplastic material which improves the heat and abrasion resistance, to other additives which are especially adapted to improve the running properties of the slide layer, and that the minimum percentage of the additive which increases the abrasion resistance should be near 30 percent by weight, relative to the total weight of the anti-friction or slide layer. Materials which are suitable for use as additives, to be admixed with the additive thermoplastic material that improves the heat and abrasion resistance are: Finely powdered graphite, molybdenum disulfide and oxides. There can also be embedded in the slide layer, for instance, at the location of the bonding surface between the slide layer and the substrate, a supporting matrix such as of bearing material. This supporting matrix can be, for example, of stannous bronze, and can be in the form of a weave of strands or wires.

In another embodiment of the invention, the side surface of the substrate which supports the anti-friction or slide layer can be coated with a sinter skeleton, such as of bearing alloy.

But the substrate itself can also be constituted of a sinter skeleton, such as of bearing alloy. Other possibilities are that the substrate is constituted of perforated steel or bronze sheet.

The anti-friction or slide layer can be approximately 0.1 mm to 0.5 mm thick and can be machined by chip making methods on its running surface, if applicable.

For the production of the laminate according to the invention, a method can be employed in which a band constituting the substrate is coated continuously with the material that forms the anti-friction or slide layer, as by intimately mixing the ingredients of this material, namely polyimide lacquer, finely powdered polyimide resin, and fillers, and thereafter homogenizing them to a high-viscous or pasty form, after which the mixture so prepared is applied to the substrate in a quantity corresponding to the desired coating thickness. The coated mixture is then hardened on the substrate.

According to the invention, the laminate as provided herein can be advantageously produced by a better method, as well, which is characterized in that the ingredients of the material forming the anti-friction or slide layer, namely polyimide lacquer, fine-grained or fine-powdered polyimide resin, and filler, are mixed intimately, homogenized to a high-viscous or pasty form, and then, after incorporating the thermoplastic additive materials, the viscoity as thus increased is altered to a lower value suited for the electrostatic spray of the mixture, whereby the anti-friction or slide layer can be continuously applied to a band constituting the substrate by an elctrostatic spraying method, and then subsequently hardened.

The advantage of this latter method is that an extremely uniform coating is assured, which makes an aftertreatment unnecessary or, if required, necessary only to a slight degree. In the method according to the invention, the coated band can be worked to the specified final thickness by rolling it, prior to the final hardening process.

Figure 2:
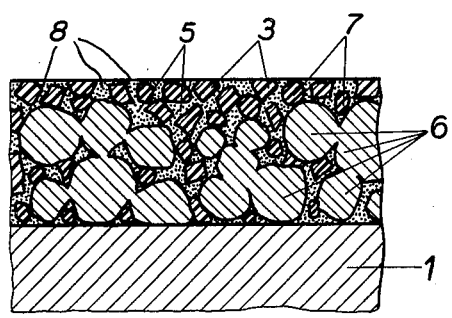
Figure 3:
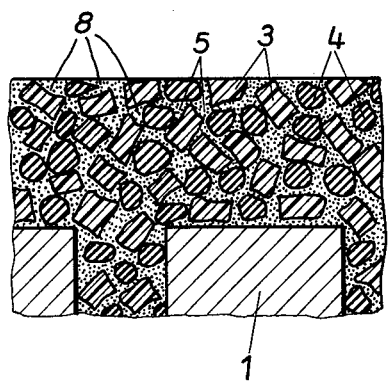
Figure 4:
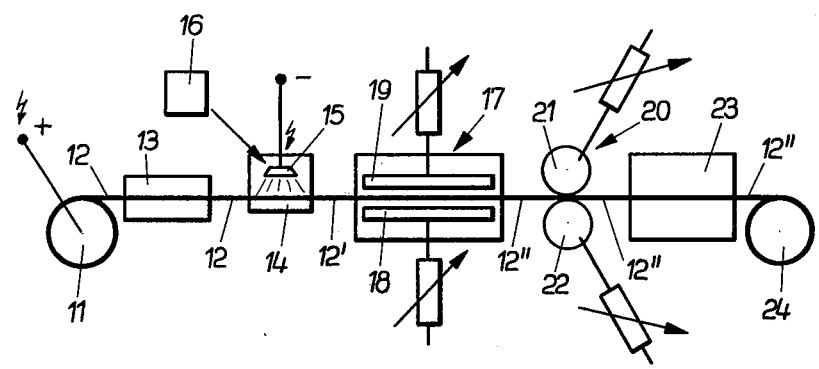

Some embodiment examples of the invention are explained below in greater detail, with reference to the drawing in which:

FIG. 1 shows an enlarged transverse section of a laminate according to the invention, FIG. 2 is a similar section of a laminate constituting another embodiment of the invention, FIG. 3 is also a like section of a laminate, constituting yet another embodiment of the invention, and FIG. 4 is a diagrammatic representation of an apparatus for the production of a laminate according to the invention, with respect to the embodiment shown in FIG. 1.

In the example of FIG. 1, a bearing material shown as being in the form of a weave 2, consisting of stannous bronze strands or wires, is bonded to a steel band substrate 1. The stannous bronze weave 2 is permeated by a mixture of polyimide plastic particles 3, thermoplastic polphenylene sulfide particles 4 and a polyimide lacquer substance 5 which holds all the particles 3 and 4 and the stannous bronze weave 2 together and bonds them to the substrate 1.

In the example of FIG. 2, a sinter skeleton 6 of bearing material such as bronze is applied to a substrate 1 such as of steel. Impregnated in the sinter skeleton 6 is a mixture of polyimide particles 3, thermoplastic polyarylene sulfide particles 7 and graphite particles 8 as well as a polyimide lacquer substance 5 which holds all the particles together and bonds them to the sinter skeleton 6 and to the substrate 1.

In the example of FIG. 3, a perforated substrate 1' such as a perforated steel sheet is provided. The substrate 1' is coated on one side with a mixture of polyimide particles 3, thermoplastic polyphenylene sulfide particles 4, graphite particles 8 and a polyimide lacquer substance 5 which holds all the particles together, the mixture also penetrating the holes in the substrate 1'.

The substrates 1 or 1' can also be omitted, within the scope of the invention, particularly if the slide layer formed of the mixture of polyimide particles 3, thermoplastic additive particles 4 or 7, and possibly particles 8 to improve the running properties, and polyimide lacquer holding all the particles together, contains an insert assuring adequate mechanical strength to the coating, such as the stannous bronze weave 2 shown in FIG. 1 or the self-supporting sinter skeleton 6.

The thickness of the anti-friction or slide layer can be approximately 0.15 mm to 0.5 mm, particularly in the examples of FIGS. 1 and 3. This coating thickness and the way in which the layer is built up make it possible to machine the anti-friction or slide surface by a chip-making process, should this be necessary during the manufacturing procedure.

The execution of the method which is particularly advantageous for the production of the laminate according to the invention becomes clear from FIG. 4.

According thereto, a metallic substrate or band 12 is unwound from an unwinding mechanism 11 and led through a cleaning and degreasing line 13. After being cleansed and degreased on both its surfaces, the substrate band 12 runs from the cleaning and degreasing line 13 into a heatable spray booth 14 which has heaters H and which contains an electrostatic sprayer 15 adapted to coat one side of the band 12 with an antifriction plastic coating. A mixture of polyimide lacquer, fine-grained or fine-powdered polyimide resin, and fillers, plus thermoplastic additives increasing the abrasion resistance, is fed to the electrostatic sprayer 15 by a mixer 16. The mixture of the polyimide lacquer, fine-grained or fine-powdered polyimide resin, and fillers is mixed intimately and homogenized to a highly viscous or pasty form in the mixer 16. After adding the thermoplastic additives which improve the heat resistance and increase the abrasion resistance, the viscosity of the mixture is adjusted in the mixer 16 to a lower value that is suitable for electrostatic spraying of the mixture.

The band 12' that is coated on one side with the plastic coating now runs through a continuous furnace 17 whose bottom and top heating elements 18 and 19 can be controlled independently of each other, as shown. In the continuous furnace 17 the sprayed-on mixture of polyimide lacquer, fine-grained or fine-powdered polyimide resin, and fillers, plus the thermoplastic additives which improve the heat resistance and increase the abrasion resistance are fused into one coherent layer. The band 12', with the fused layer, that comes out of the continuous furnace 17 now runs into a rolling stand 20, where it is possible to control the temperature of the rolls 21 and 22 by controllers C, as shown. In the rolling stand 20 the antifriction coating which has been applied but not yet cooled down completely, is reduced to the desired final thickness. At the same time, the upper roll 21 of the rolling stand 20 can be profiled as at P to provide in the same rolling operation a series of depressions in the sliding surface, for the accommodation of initial lubricants. The rolled band 12" leaving the rolling stand 20 then reaches a continuous cooling system 23 in which the antifriction coating is cooled completely. The band can then be wound into a coil 24.

If desired, a stannous bronze weave 2 can be inserted into the antifriction coating to be produced. This can be done after the band 12 has left the degreasing and cleaning line 13. But it is also possible to coat the band 12 unilaterally with a sinter skeleton of bearing material such as bronze (see FIG. 2). In such a case, it will be advantageous to make provisions for the application of bronze in powder form and for sintering it to form the sinter skeleton 6 between the degreasing and cleaning line 13 and the spray booth 14.

EMBODIMENT EXAMPLE 1

41 parts by weight of a polyimide resin solution (polyimide lacquer) are mixed with 28 parts by weight of a finely powdered mixture of 75 parts by weight polybismaleineimide and 25 parts by weight graphite, 17 parts by weight n-methylpyrrolidone and 11 parts by weight xylol, and then homogenized in a three-roll mill. The mixture thus obtained is mixed with a thermoplastic polyphenylene sulfide calculated to amount to 30 percent by weight of the finished coating. The complete mixture is adjusted by means of xylol to a viscosity suited for electrostatic spraying and fed to the electrostatic sprayer 15.

EMBODIMENT EXAMPLE 2

The composition of the starting material and its homogenization are the same as in Example 1. Thermoplastic polyarylene sulfide in a quantity calculated to amount to 30 percent by weight of the finished coating is admixed with the homogenized premixture. After intensive mixing and viscosity adjustment by adding xylol to obtain a low-viscosity value suited for electrostatic spraying, this mixture is fed to the electrostatic sprayer 15.

By adjusting the bottom heat 18 and the top heat 19 of the furnace 17, the temperature in both embodiment examples is to be set to 200° C. at the coating to be teated, whereby the coating is freed of xylol and fused into one uniform coating within the continuous furnace 17 over a period of 1.5 to 2 minutes.

To effect the electrostatic spraying, the coil 11 can be polarized positively, and the sprayer 15 polarized negatively, as indicated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are are therefore intended to be embraced therein.

What is claimed is:

1. A laminate for anti-friction and slide members, comprising in combination:
   (a) a metallic substrate,
   (b) a synthetic thermally highly stressable plastic slide layer comprising thermosetting polyimide resins in finelypowdered form bonded to one surface of the substrate,
   (c) said slide layer containing as a binder a polyimide lacquer which bonds the slide layer to the substrate,
   (d) said slide layer additionally containing a material for improving the heat and abrasion resistance, selected from the group consisting of polyarylene sulfide, aliphatic polysulfide and polysulfone.
2. A laminate according to claim 1, wherein:
   (a) the slide layer additionally contains polytetrafluorethylene to improve its running properties.
3. A laminate according to claim 2, wherein:
   (a) the polytetrafluorethylene and the material for improving the heat and abrasion resistance which is selected from the sulfide or sulfone group, together constitute by weight, between 30 percent and 80 percent relative to the weight of the entire slide layer.
4. A laminate according to claim 2, wherein:
   (a) the minimum amount of material selected from the sulfide or sulfone group is approximately 30 percent by weight relative to the weight of the slide layer.
5. A laminate according to claim 1, wherein:
   (a) the material selected from the sulfide or sulfone group consists of polyphenylene sulfide.
6. A laminate according to claim 1, wherein:
   (a) the material selected from the sulfide or sulfone group contains polyarylene sulfide.

* * * * *